United States Patent
Gao et al.

(10) Patent No.: US 9,971,416 B2
(45) Date of Patent: May 15, 2018

(54) CHINESE CHARACTER ENTRY VIA A PINYIN INPUT METHOD

(71) Applicant: INTERNATIONAL BUSINESS MACHINES CORPORATION, Armonk, NY (US)

(72) Inventors: Wei Bin Gao, Beijing (CN); Hong Bo Peng, Beijing (CN); Cheng Xu, Beijing (CN); Quan Wen Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 14/604,506

(22) Filed: Jan. 23, 2015

(65) Prior Publication Data
US 2015/0212586 A1   Jul. 30, 2015

(30) Foreign Application Priority Data
Jan. 29, 2014   (CN) .......................... 2014 1 0042928

(51) Int. Cl.
*G06F 3/01* (2006.01)
*G06F 3/023* (2006.01)
*G06F 3/0488* (2013.01)

(52) U.S. Cl.
CPC ............ *G06F 3/018* (2013.01); *G06F 3/0233* (2013.01); *G06F 3/04886* (2013.01)

(58) Field of Classification Search
CPC ....................................................... G06F 3/018
See application file for complete search history.

(56) References Cited

U.S. PATENT DOCUMENTS

2005/0104869 A1*  5/2005  Chung ................... G06F 3/018
                                                           345/179
2011/0022956 A1*  1/2011  Sung ...................... G06F 3/018
                                                           715/702

(Continued)

FOREIGN PATENT DOCUMENTS

CN           1388430 A        1/2003
CN           1677321 A        10/2005

(Continued)

OTHER PUBLICATIONS

Po, L.M. et al. Dynamic Candidate Keypad for Stroke-based Chinese Input Method on Touchscreen Devices. 2011 IEEE Symposium on Computers & Informatics (ISCI), Mar. 20-23, 2011, Kuala Lumpur. pp. 147-152.

*Primary Examiner* — Kee M Tung
*Assistant Examiner* — Grace Q Li
(74) *Attorney, Agent, or Firm* — The Steadman Law Firm PLLC

(57) ABSTRACT

A Chinese character Pinyin input method and apparatus are disclosed. The method includes displaying on a human-machine interaction interface (HMI) initial keys representing all initials and simple final keys representing all simple finals. The method further includes, in response to an operation with respect to a simple final, displaying on the HMI auxiliary keys corresponding to the simple final, wherein various combinations of the simple final and symbols represented by the auxiliary keys respectively form compound finals starting with the simple final. The disclosed method and apparatus are especially applicable to inputting Chinese characters on a touchscreen of smart devices, such as mobile phones.

20 Claims, 14 Drawing Sheets

(56) References Cited

U.S. PATENT DOCUMENTS

| | | | | |
|---|---|---|---|---|
| 2012/0162086 A1* | 6/2012 | Rhee | ................ | G06F 3/018 345/171 |
| 2013/0076641 A1* | 3/2013 | Li | ................ | G06F 3/018 345/171 |
| 2013/0091455 A1* | 4/2013 | Park | ................ | G06F 3/04886 715/773 |
| 2013/0174091 A1* | 7/2013 | Park | ................ | G06F 3/018 715/811 |

FOREIGN PATENT DOCUMENTS

| | | | |
|---|---|---|---|
| CN | 1834869 | A | 9/2006 |
| CN | 101334692 | B | 10/2010 |
| CN | 101950240 | A | 1/2011 |
| CN | 102081490 | A | 6/2011 |
| CN | 102323872 | A | 1/2012 |
| CN | 102707863 | A | 10/2012 |
| CN | 102902410 | A | 1/2013 |
| CN | 102902486 | A | 1/2013 |
| CN | 103080888 | A | 5/2013 |
| CN | 103235696 | A | 8/2013 |
| CN | 102289290 | B | 9/2013 |
| WO | 2012129954 | A1 | 10/2012 |
| WO | 2012167580 | A1 | 12/2012 |

\* cited by examiner

CHINESE CHARACTER ENTRY VIA A PINYIN INPUT METHOD

BACKGROUND

The present invention relates to the field of information processing, and more specifically relates to Chinese character entry via a Pinyin input method.

There are various Pinyin input methods available for quickly inputting Chinese characters on devices, such as computers and mobile phones, by entering Chinese character Pinyin letters. A Shuangpin input method has been proposed in the known art, by which a Chinese character may be input through entering merely two letters. However, the Shuangpin input method requires users to remember correspondences between keyboard letters and initial symbols and correspondences between keyboard letters and final symbols.

A Pinyin input method used on touchscreens has been disclosed in CN101950240. According to the specification of the input method, users need not remember correspondences between keyboard letters and initials/finals. A user may complete the Pinyin input of a Chinese character through two strokes or touch actions. According to this input method, in an initial state, an initials keyboard having all initials arranged thereon is presented on a touchscreen. At first, a user may click on or touch an initial key on the initials keyboard, and then the relevant system may dynamically switch the initials keyboard to a finals keyboard, on which final keys that may be used in conjunction with the selected initial are presented. The user may click on or touch a final key on the finals keyboard to complete the Pinyin input of a Chinese character. The system retrieves Chinese characters based on the input content of this Pinyin input and puts them in a candidate character area as candidates that may be selected by the user. After a user selection from the candidate Chinese characters, the system may return to the initial state.

During such Chinese character input process, either an initials keyboard or a finals keyboard, on which finals keys that may be used in conjunction with a present initial are arranged, is displayed. Upon display of an initials keyboard (e.g., in the initial state), to enter a vowel (e.g., "a") a user must click on or touch a function key other than initial keys on the initials keyboard to switch the initials keyboard to a finals keyboard. Upon display of a finals keyboard, if a user wants to reenter an initial (e.g., in order to correct an initial entered by mistake), the user must click on or touch a function key other than final keys on the finals keyboard to switch back to the initials keyboard. During such input process, the user may only view either the initials keyboard or the finals keyboard at any given time, which is inconvenient to intuitive operation.

SUMMARY

An object of the present invention is to provide an improved input method for Chinese character entry.

According to one aspect of the present invention, a method is provided that includes displaying on a human-machine interaction interface (HMI) initial keys representing all initials and simple final keys representing all simple finals. The method further includes, in response to an operation with respect to a simple final, displaying on the HMI auxiliary keys corresponding to the simple final, wherein various combinations of the simple final and symbols represented by the auxiliary keys respectively form compound finals starting with the simple final.

According to another aspect of the present invention, an apparatus is provided that includes a main keyboard presentation module configured to display on a HMI initial keys representing all initials and simple final keys representing all simple finals on a screen. The apparatus further includes an auxiliary keyboard presentation module configured to, in response to an operation with respect to a simple final, display on the HMI auxiliary keys corresponding to the simple final, wherein various combinations of the simple final and symbols represented by the auxiliary keys respectively form compound finals starting with the simple final.

According to a further aspect of the present invention, a computer program product is provided that includes a computer readable storage medium having computer readable program code embodied thereon, wherein the computer readable program code is adapted to perform one or more steps of the above recited method.

In the present invention, the Chinese phonetic system is constructed as a three-level structure: initials (or initial consonants), simple finals, and ending parts of compound finals corresponding to the simple finals. Through selectively and dynamically displaying auxiliary keys representing ending parts of compound finals, initials and finals may be displayed simultaneously without consuming excessive screen space. Furthermore, users need not remember any particular keyboard positions, leading to convenient and fast operation.

BRIEF DESCRIPTION OF THE SEVERAL VIEWS OF THE DRAWINGS

Through the more detailed description of embodiments of the present disclosure in the accompanying drawings, the above and other objects, features, and advantages of the present disclosure will become more apparent. The same reference generally refers to the same component within the embodiments of the present disclosure.

DETAILED DESCRIPTION

Various embodiments are described herein in further detail with reference to the accompanying drawings, in which the preferable embodiments of the present disclosure have been illustrated. However, the present disclosure can be implemented in various ways and thus should not be construed to be limited to the embodiments disclosed herein.

The embodiments disclosed herein are provided to convey the scope of the present disclosure to those skilled in the art.

Figure 1:
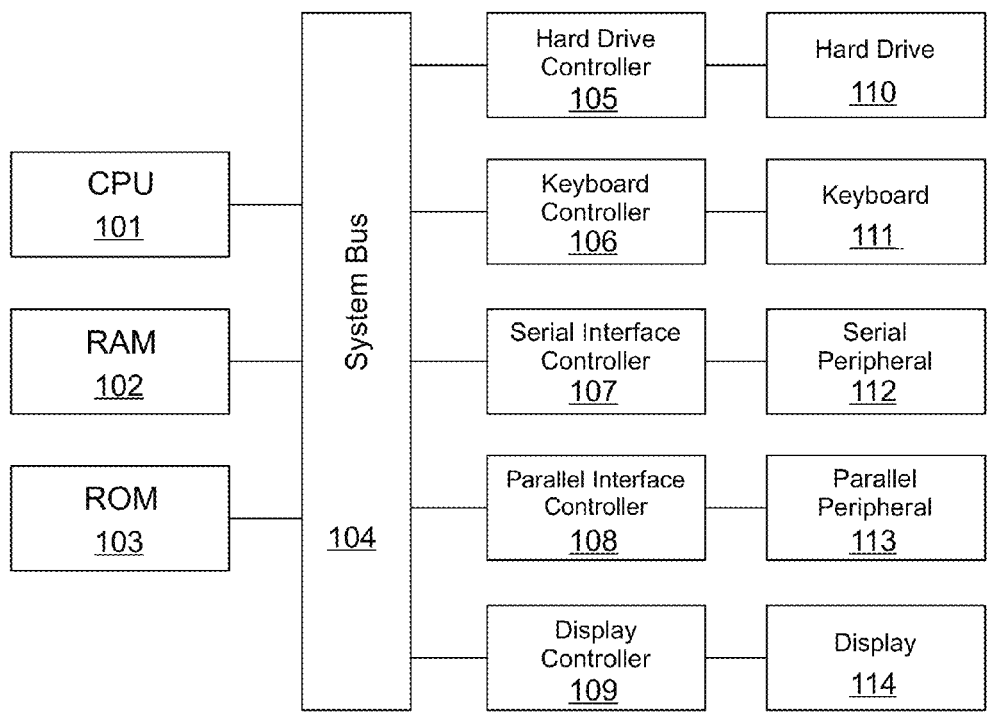
FIG. 1 shows an exemplary computer system 100 applicable to implement the embodiments of the present invention.

FIG. 1 shows an exemplary computer system 100 applicable to implement the embodiments of the present invention. As shown in FIG. 1, computer system 100 may include central processing unit (CPU) 101, random access memory (RAM) 102, read-only memory (ROM) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113, and display 114. Among these devices, CPU 101, RAM 102, ROM 103, hard drive controller 105, keyboard controller 106, serial interface controller 107, parallel interface controller 108, and display controller 109 are coupled to system bus 104. Hard drive 110 is coupled to hard drive controller 105. Keyboard 111 is coupled to keyboard controller 106. Serial peripheral equipment 112 is coupled to serial interface controller 107. Parallel peripheral equipment 113 is coupled to parallel interface controller 108. Display 114 is coupled to display controller 109. It should be understood that computer system 100 as shown in FIG. 1 is only for exemplary purposes and does not indicate any limitation to the present invention. In some cases, devices may be added to or removed from computer system 100 based on specific scenarios.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, microcode, etc.), or an embodiment combining software and hardware aspects that all generally may be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of such computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain or store a program for use by or in connection with an instruction execution system, apparatus, or device.

A computer readable signal medium may include a propagated data signal with computer readable program code embodied therein, e.g., in baseband or as part of a carrier wave. Such propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The method and apparatus provided in the present invention may be implemented in computer system 100 shown in FIG. 1.

Basic concepts involved in the present invention are introduced below. The Chinese phonetic (Pinyin) system includes initials (or initial consonants) and finals. There are 23 initials, including "b", "p", "m", "f", "d", "t", "n", "l", "g", "k", "h", "j", "q", "x", "zh", "ch", "sh", "r", "z", "c", "s", "y, and "w". There are 33 finals, including simple finals and compound finals, as shown in Table 1.

TABLE 1

| Simple finals | compound finals | | | | | | |
|---|---|---|---|---|---|---|---|
| a | ai | ao | an | ang | | | |
| o | ou | ong | | | | | |
| e | ei | en | eng | er | | | |
| i | ia | ie | iao | iu | in | ian | ing iang |
| u | ua | uai | uan | ui | uang | un | |
| ü | üe | üan | ün | | | | |

As shown in Table 1, there are 6 simple finals, including "a", "o", "e", "i", "u", and "ü". There are 4 compound finals starting with "a", including "ai", "ao", "an", and "ang". There are 2 compound finals starting with "o", including "ou" and "ong". There are 4 compound finals starting with "e", including "ei", "en", "eng", and "er". There are 8 compound finals starting with "i", including "ia", "ie", "iao", "iu", "in", "ian", "ing", and "iang". There are 6 compound finals starting with "u", including "ua", "uai", "uan", "ui", "uang", and "un". There are 3 compound finals starting with "ü", including "üe", "üan", and "ün".

Displaying a virtual keyboard showing all initials and finals on a screen for selection by users to input Chinese character Pinyin symbols may occupy excessive screen space. According to the present invention, the input of a Chinese Pinyin is realized using initial keys, simple final keys, and auxiliary keys that are dynamically displayed.

An initial key is used to represent at least one initial. An initial key may represent one initial. Generally, initial keys are designated by the initials represented. For example, an initial key representing initial "b" may be designated by "initial key b", and an initial key representing initial "zh" may be designated by "initial key zh". In a particular embodiment of the present invention, an initial key may represent several initials, e.g., initials "w" and "r" may share the same initial key.

Simple final keys represent simple finals. Similarly, a simple final key may represent one or several simple finals. In this description, simple final keys are designated by the simple finals represented. For example, a simple final key representing simple final "a" may be designated by "simple final key a".

Unless particularly specified otherwise herein, in the embodiments an initial key represents an initial and a simple final key represents a simple final. According to the invention, a corresponding auxiliary keyboard that is dynamically displayed is provided for each simple final. The auxiliary keyboard corresponding to each simple final includes auxiliary keys associated with the simple final.

With reference to the drawings, embodiments of inputting Pinyin representations in various forms are described herein.

Figure 2:
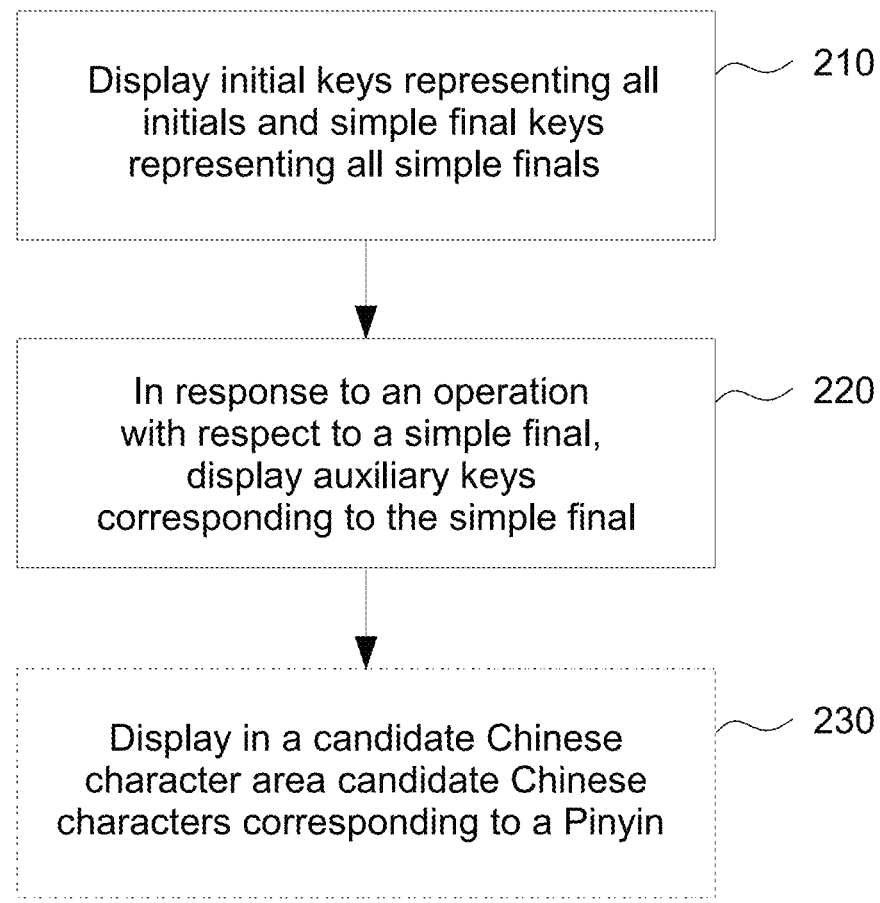
FIG. 2 schematically shows a high-level flow chart of a Chinese character Pinyin input method, according to an embodiment of the invention.

FIG. 2 schematically shows a high level flow chart of a method 200, according to an embodiment of the present invention. At step 210, initial keys representing all initials and simple final keys representing all simple finals are displayed on a human-machine interaction interface (HMI), e.g., on a screen. The screen may be a display screen of a smart device, such as a computer or a mobile phone, and may include a conventional LED display screen or a touchscreen. Step 210 may be initiated in response to operating a smart device by a user to select a Pinyin input method for Chinese character entry. An initial state is entered as a result of the execution of step 210.

Figure 3:
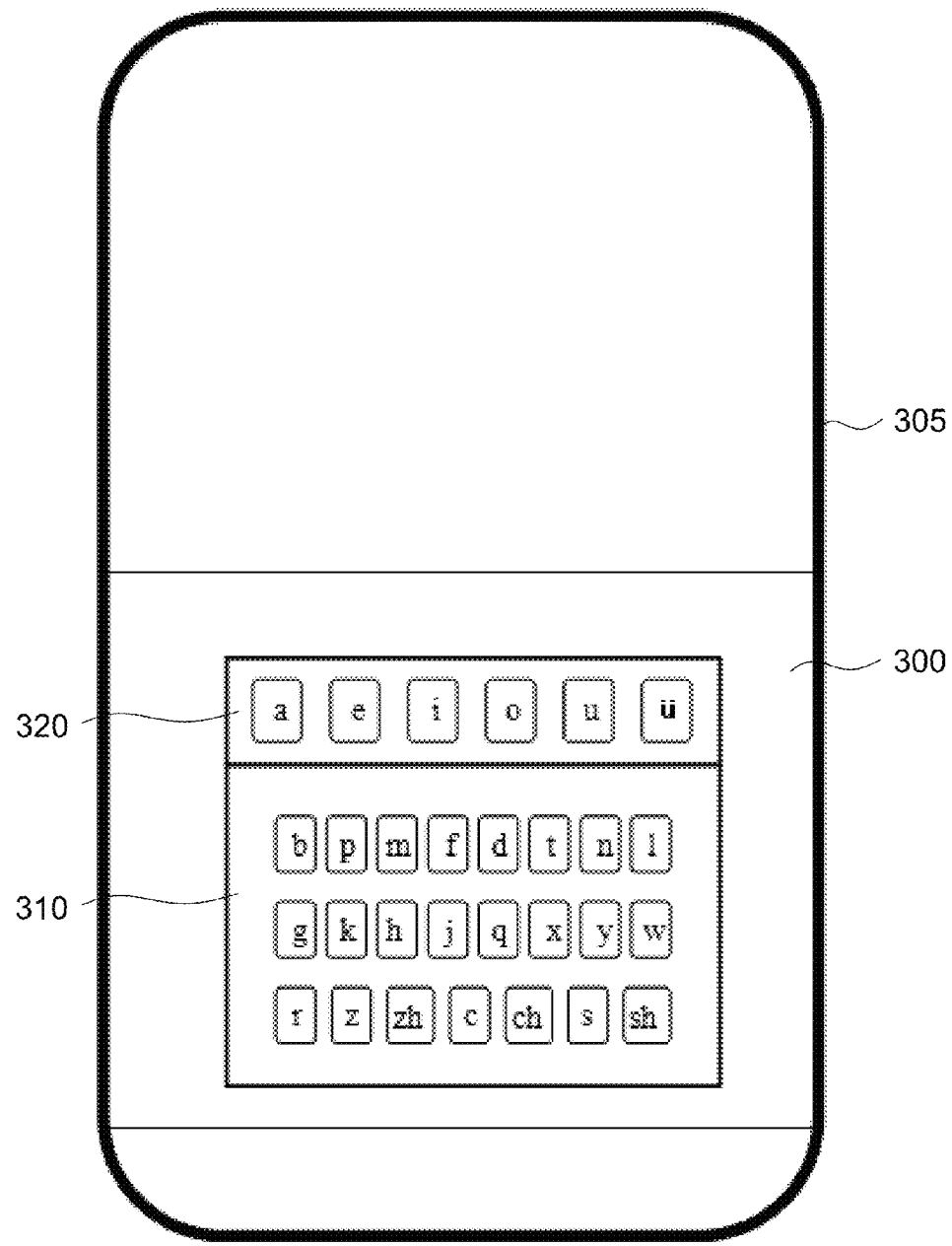
FIG. 3 schematically shows a human-machine interaction interface (HMI) that includes an initial state of a keyboard layout during a Pinyin input process, according to an embodiment of the invention.

FIG. 3 shows a HMI 300 on a screen of a smart device 305. HMI 300 includes an initial state of a keyboard layout used for Pinyin input, according to an embodiment of the present invention. As shown in FIG. 3, in the initial state, respective initial keys representing all 23 initials "b", "p", "m", "f", "d", "t", "n", "l", "g", "k", "h", "j", "q", "x", "zh", "ch", "sh", "r", "z", "c", "s", "y", and "w" are displayed on HMI 300 in an area 310. Respective simple final keys representing all 6 simple finals "a", "o", "e", "i", "u", and "ü" also are displayed in an area 320.

Area 310 where the initial keys are located on the screen is distinct from area 320 where the simple final keys are located. However, such location distinction is not necessary for the present invention. In some particular embodiments, the initial keys and the simple final keys may be disposed in the same area without any effect on the implementation of the present invention.

Further, in some particular embodiments, relative positions between initial keys and relative positions between simple final keys may differ from the relative positions as shown in FIG. 3. Various keyboard layouts that may be adopted to implement the present invention are described herein with reference to the drawings.

Returning to FIG. 2, in the initial state, further operations may be performed to complete the Pinyin input of a Chinese character. At step 220 of the method 200, in response to an operation with respect to a simple final, auxiliary keys associated with the simple final are displayed, wherein various combinations of the simple final and symbols represented by the auxiliary keys form compound finals starting with the simple final. As further described herein, auxiliary keys associated with respective simple finals are displayed in HMIs as depicted in FIGS. 4-7.

According to an embodiment of the present invention, the operation with respect to a simple final at step 220 comprises selecting a simple final key representing the simple final. For example, a user may touch a simple final key with a finger, or point to the simple final key with a screen selection pointer (e.g., a mouse). In some situations, for example, if there is a relatively large space between simple final keys on the screen, the user may point a finger or a mouse in the proximity of a particular simple final key, or slide towards the simple final key from a position, to indicate an intention of touching the simple final key. The smart device on which the screen is provided may determine that the above finger/mouse action corresponds to touching the particular simple final key according to the intention of the user determined based on the space between simple final keys.

As shown in Table 1, a compound final (e.g., "ai") is composed of a simple final (e.g., "a") and an ending part (for example, "i"). In other words, if there is an auxiliary key representing "i", the compound final "ai" may be composed of a simple final "a" and a symbol "i" represented by the auxiliary key.

Table 2 shows simple finals and symbols represented by their associated auxiliary keys.

TABLE 2

| Simple final | symbols represented by associated auxiliary keys | | | | | | |
|---|---|---|---|---|---|---|---|
| a | i | o | n | ng | | | |
| o | u | ng | | | | | |
| e | i | n | ng | r | | | |
| i | a | e | ao | u | n | an | ng ang |
| u | a | ai | an | i | ang | n | |
| ü | e | an | n | | | | |

For example, the row of simple final "u" shows that there are 6 auxiliary keys associated with simple final "u", representing Pinyin symbols "a", "ai", "an", "i", "ang", and "n", respectively. Combinations of simple final "u" and symbols "a", "ai", "an", "i", "ang", and "n" respectively form compound finals "ua", "uai", "uan", "ui", "uang", and "un" starting with simple final "u", as shown in Table 1.

As shown in Table 2, the respective combinations of simple finals "a", "o", "e", "i", "u", and "ü" and symbols represented by their associated auxiliary keys form corresponding compound finals.

At step 230 of the method 200, candidate Chinese characters corresponding to a Pinyin are displayed in a candidate Chinese character area. A complete Pinyin of a Chinese character must be entered to input the Chinese character with the Pinyin input method. Complete Pinyin representations may be in one of the following forms: (i) "<initial>+<simple final>", (ii) "<initial>+<compound final>", (iii) "<simple final>", and (iv) "<compound final>". According to embodiments, respective schemes involving these Pinyin forms are described below. Specifically, a first scheme involving a Pinyin having the form "<initial>+<simple final>", a second scheme involving a Pinyin having the form "<initial>+<compound final>", a third scheme involving a Pinyin having the form "<simple final>", and a fourth scheme involving a Pinyin having the form "<compound final>" are described.

According to an embodiment of the present invention, the operation with respect to a simple final at step 220 includes one of (i) touching an initial key at first and then touching a simple final key representing the simple final or (ii) sliding from an initial key to a simple final key representing the simple final. Such embodiment is applicable to the first scheme and the second scheme, as described below.

Figure 4:
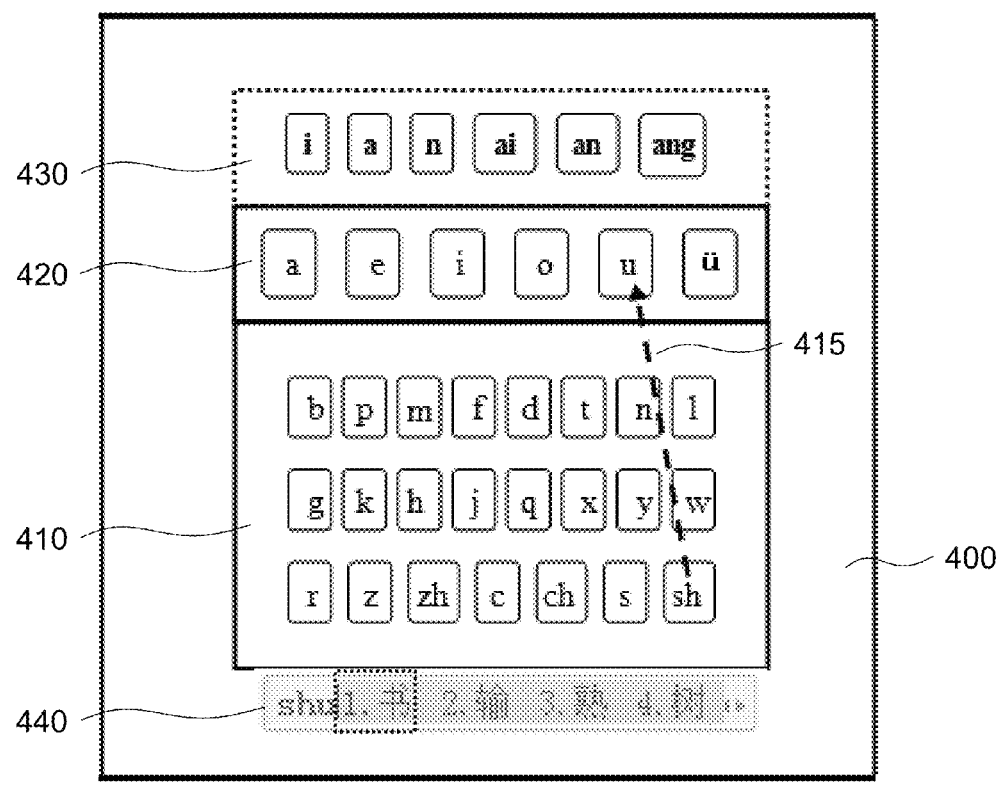
FIG. 4 to FIG. 7B schematically show respective HMIs during the Pinyin input process, according to various embodiments of the invention.

FIG. 4 schematically shows a HMI 400 during the Pinyin input process, according to an embodiment of the present invention. The input process as illustrated in FIG. 4 represents the first scheme of the present invention, corresponding to Pinyin form "<initial>+<simple final>". FIG. 4 illustrates an example in which a Chinese character "书" is inputted through entry of a Pinyin representation in the form "<initial>+<simple final>".

The input process as illustrated in FIG. 4 starts from the initial state as shown in FIG. 3. In the initial state, as with HMI 300, initial keys are displayed in an area 410 within a keyboard layout of HMI 400, and simple final keys are displayed in an area 420, in accordance with step 210 of the method 200.

As a first action, as shown by an arrow 415 pointing to simple final "u" from initial "sh", a user clicks on the initial key "sh" and then clicks on the simple final key "u", or alternatively the user slides a finger from the initial key "sh" to the simple final key "u". In response to clicking on or touching the simple final key "u", computer system 100 displays corresponding auxiliary keys that are associated with the simple final key "u", i.e., auxiliary keys "i", "a", "n", "ai", "an", and "ang", in an area 430 (indicated by a dashed box) of the keyboard layout of HMI 400, in accordance with step 220 of the method 200.

Additionally, candidate Chinese characters {1. 书 2. 输 3. 熟 4. 树 . . . } corresponding to the Pinyin "shu" are displayed in a candidate Chinese character area 440, in accordance with step 230 of the method 200. Thus, at step 230 according to the first scheme, candidate Chinese characters are displayed in candidate Chinese character area 440 corresponding to a Pinyin which is a combination of the initial and the simple final (in this example, the Pinyin "shu" is a combination of the initial "sh" and the simple final "u").

As an additional action, the user selects "书" from the candidate Chinese character area 440, indicating completion of the Pinyin input. Candidate Chinese character area 440 is displayed under the virtual keyboard display area encompassing areas 410, 420, and 430 in HMI 400. In other implementations, candidate Chinese character area 440 may be displayed at any other positions. In response to the completion of the Pinyin input, the input process returns to the initial state.

Figure 5A:
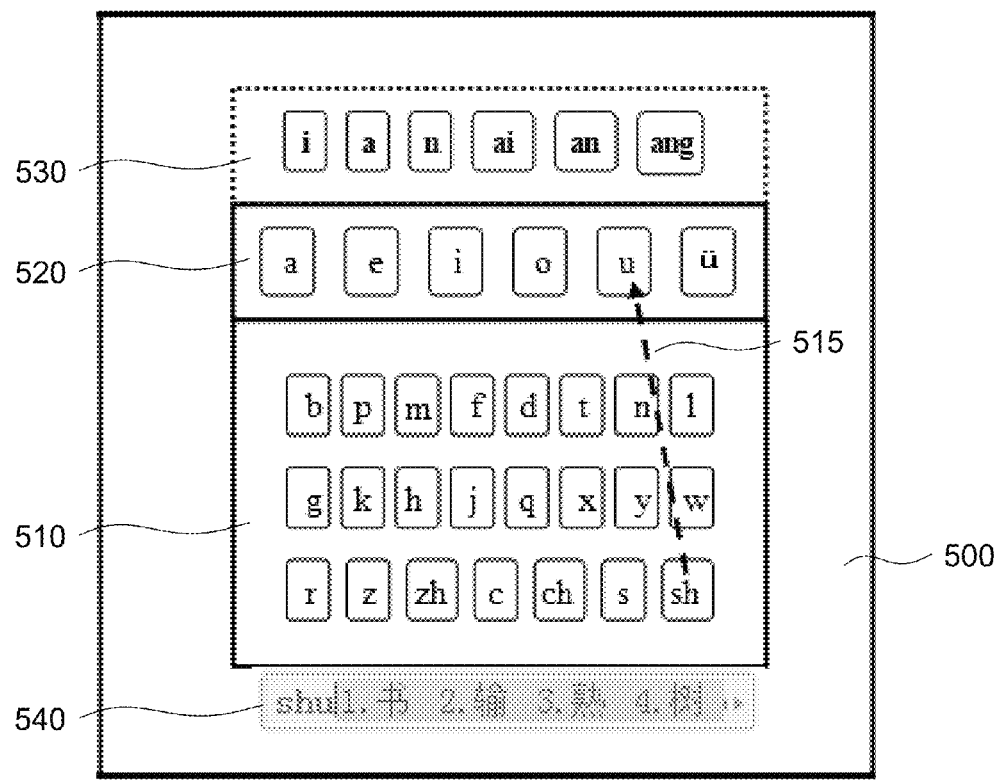
Figure 5B:
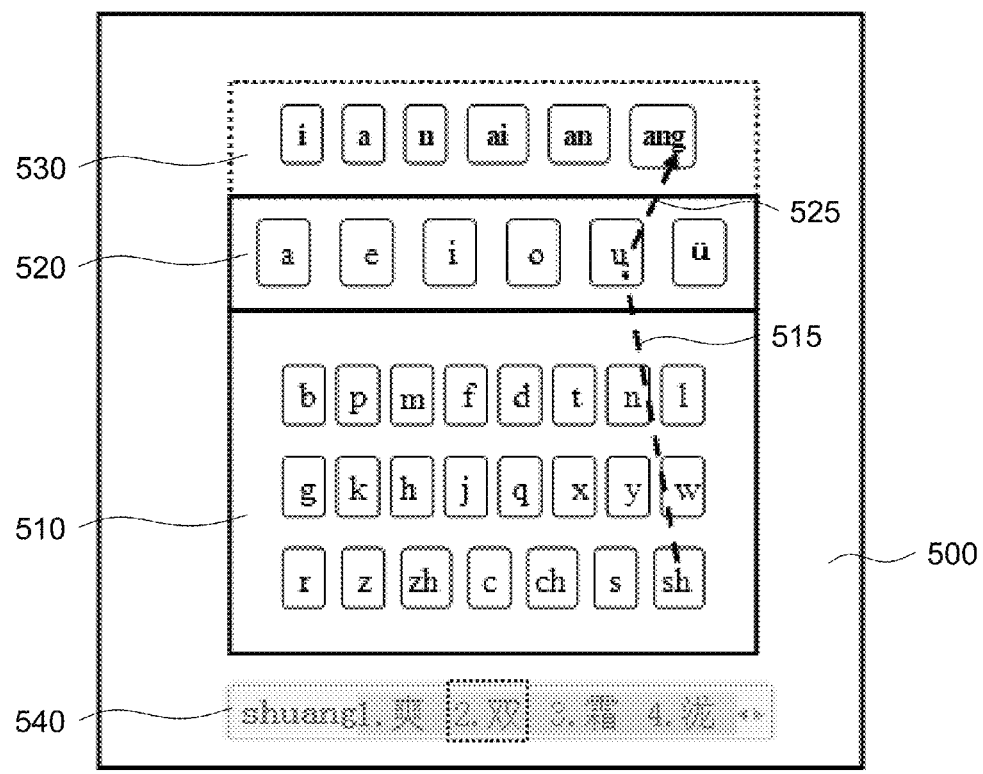

FIGS. 5A and 5B schematically show a HMI 500 during the Pinyin input process, according to a further embodiment of the present invention. The input process as illustrated in FIGS. 5A and 5B represents the second scheme of the present invention, corresponding to Pinyin form "<initial>+<compound final>". FIGS. 5A and 5B illustrate an example in which a Chinese character "双" is inputted through entry of a Pinyin representation in the form "<initial>+<compound final>."

As shown in FIG. 5A, the input process starts from the initial state in accordance with step 210 of the method 200. In the initial state, initial keys are displayed in an area 510 within a keyboard layout of HMI 500, and simple final keys are displayed in an area 520. As a first action, as shown by an arrow 515 pointing to simple final "u" from initial "sh", a user clicks on the initial key "sh" and then clicks on the simple final key "u", or alternatively the user slides a finger from the initial key "sh" to the simple final key "u". This action is the same as the action shown by arrow 415 in FIG. 4. In response to clicking on or touching the simple final key "u", computer system 100 displays corresponding auxiliary keys that are associated with the simple final key "u", i.e., auxiliary keys "i", "a", "n", "ai", "an", and "ang", in an area 530 (indicated by a dashed box) of the keyboard layout of HMI 500, in accordance with step 220 of the method 200.

Additionally, as shown in FIG. 5A, candidate Chinese characters {1. 书 2. 输 3. 熟 4. 树 . . . } corresponding to the Pinyin "shu" are displayed in a candidate Chinese character area 540. As an additional action, the user clicks on or slides a finger from the simple final key "u" to an auxiliary key "ang", as shown by an arrow 525 in FIG. 5B pointing from the simple final "u" to the auxiliary key "ang". In response, as shown in FIG. 5B, computer system 100 displays candidate Chinese characters {1. 爽 2. 双 3. 霜 4. 泷 . . . } corresponding to the Pinyin "shuang" in the candidate Chinese character display area 540. Thus, at step 230 according to the second scheme, initially candidate Chinese characters are displayed in a candidate Chinese character area 540 corresponding to a Pinyin which is a combination of the initial and the simple final (in this example, the Pinyin "shu" is a combination of the initial "sh" and the simple final "u"), as shown in FIG. 5A. Subsequently, in response to selection of one of the auxiliary keys, candidate Chinese characters are displayed corresponding to a Pinyin which is a combination of the initial, the simple final, and a symbol represented by the selected auxiliary key (in this example, the Pinyin "shuang" is a combination of the initial "sh", the simple final "u", and the symbol "ang" represented by the selected auxiliary key), as shown in FIG. 5B.

As an additional action, the user selects "双" from candidate Chinese character area 540 as shown in FIG. 5B, indicating completion of the Pinyin input. In response to the completion of the Pinyin input, the input process returns to the initial state.

According to a further embodiment of the present invention, the operation with respect to a simple final at step 220 includes directly clicking on or touching a simple final key representing the simple final. Such embodiment is applicable to the third scheme and the fourth scheme, as described below.

Figure 6:
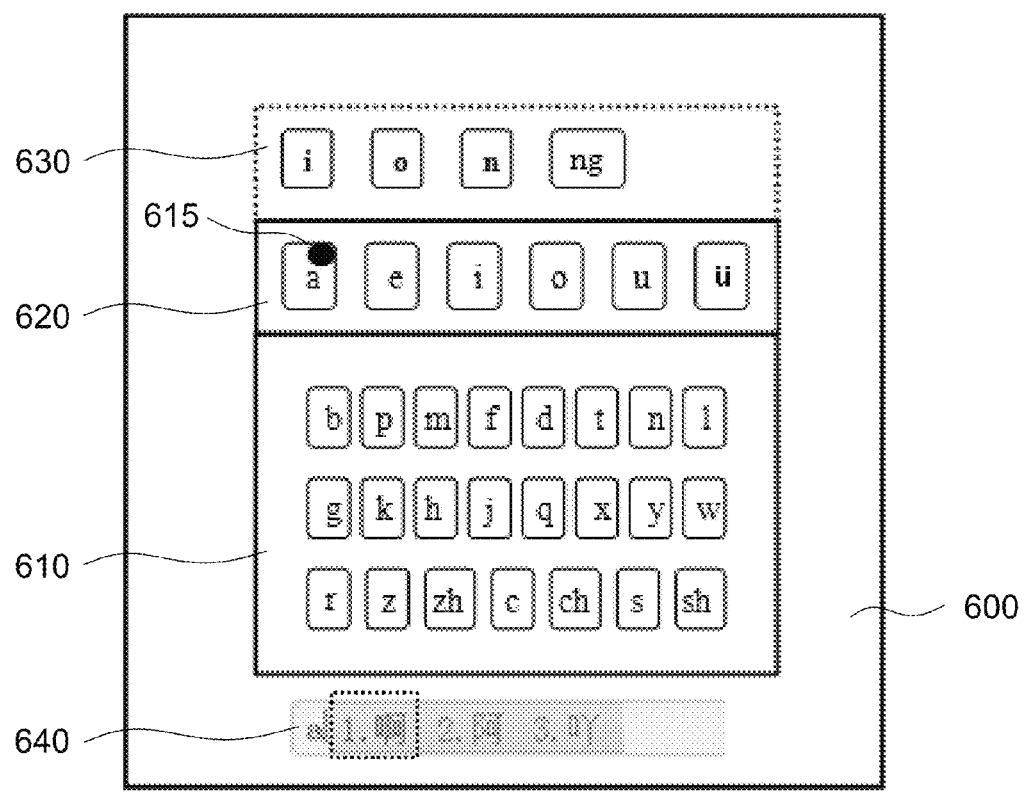

FIG. 6 schematically shows a HMI 600 during the Pinyin input process, according to an embodiment of the present invention. The input process as illustrated in FIG. 6 represents the third scheme of the present invention, corresponding to Pinyin form "<simple final>". FIG. 6 illustrates an example in which a Chinese character "啊" is inputted through entry of a Pinyin representation in the form "<simple final>".

The input process shown in FIG. 6 starts from the initial state in accordance with step 210 of the method 200. In the initial state, initial keys are displayed in an area 610 within a keyboard layout of HMI 600, and simple final keys are displayed in an area 620. As a first action, as shown by a spot 615 on the key "a", a user clicks on or touches the simple final key "a". In response to clicking on or touching the simple final key "a", computer system 100 displays auxiliary keys "i", "o", "n", and "ng" corresponding to the simple final key "a" in an area 630 (indicated by a dashed box) of the keyboard layout of HMI 600, in accordance with step 220 of the method 200.

Additionally, candidate Chinese characters {1. 啊 2. 阿 3. 吖 . . . } corresponding to the Pinyin "a" are displayed in a candidate Chinese character area 640, in accordance with step 230 of the method 200. Thus, at step 230 according to the third scheme, candidate Chinese characters are displayed in candidate Chinese character area 640 corresponding to the simple final (in this example, the Pinyin "a" is the simple final).

As an additional action, the user selects "啊" from the candidate Chinese character area 640, indicating completion of the Pinyin input. In response to the completion of the Pinyin input, the input process returns to the initial state.

Figure 7A:
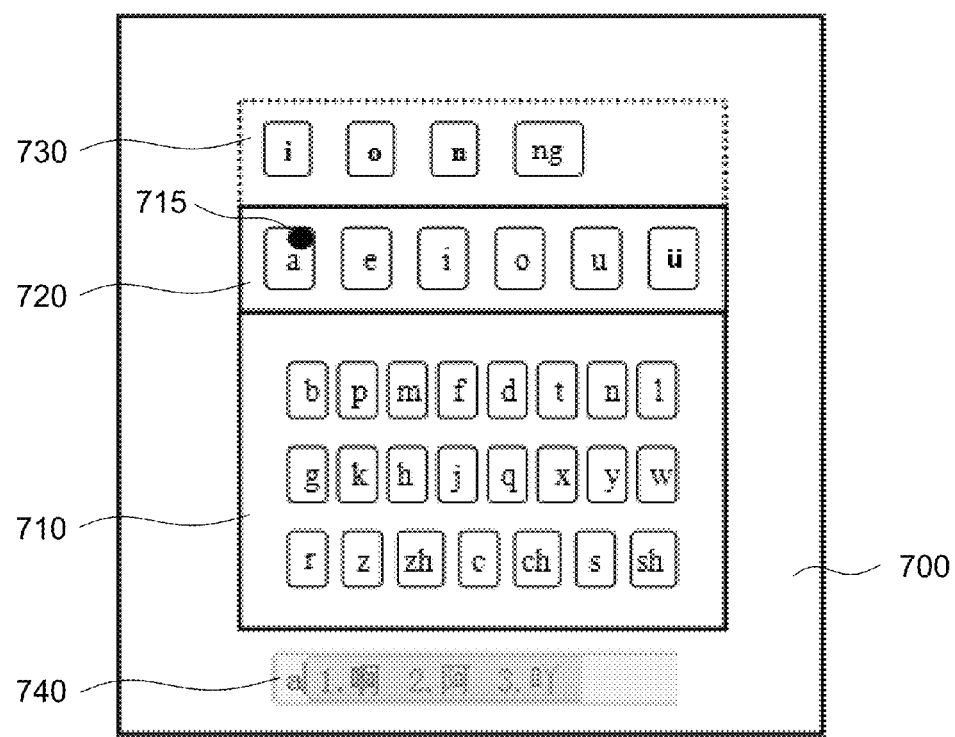
Figure 7B:
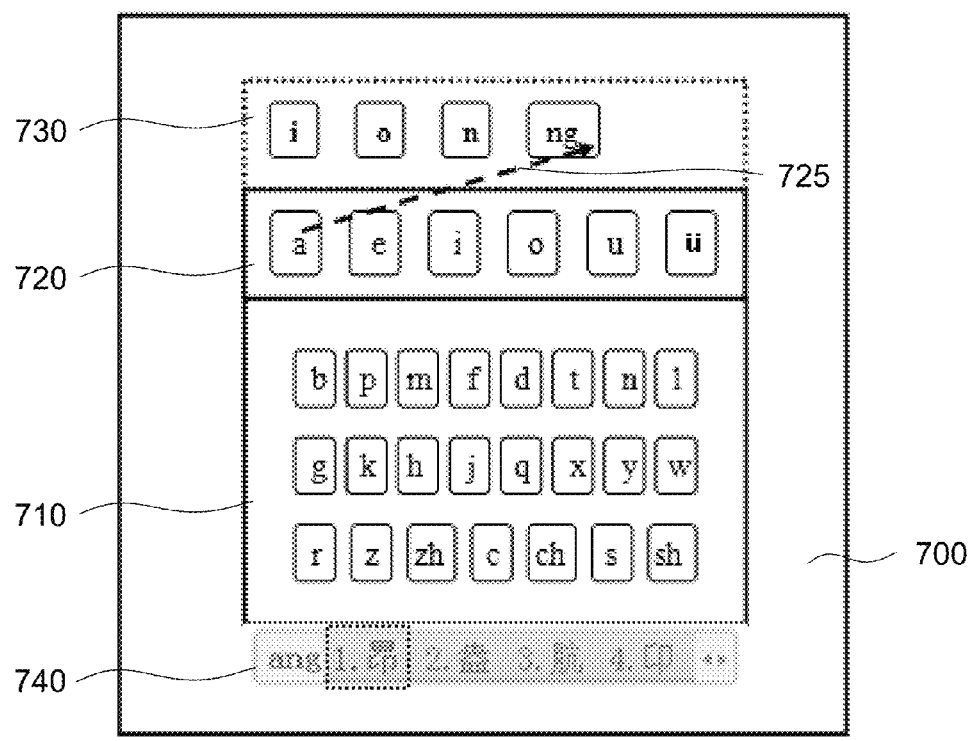

FIGS. 7A and 7B schematically show a HMI 700 during the Pinyin input process, according to an embodiment of the present invention. The input process as illustrated in FIGS. 7A and 7B represents the fourth scheme of the present invention, corresponding to Pinyin form "<compound final>". FIGS. 7A and 7B illustrate an example in which a Chinese character "昂" is inputted through entry of a Pinyin representation in the form "<compound final>".

As shown in FIG. 7A, the input process starts from the initial state in accordance with step 210 of the method 200. In the initial state, initial keys are displayed in an area 710 within a keyboard layout of HMI 700, and simple final keys are displayed in an area 720. As a first action, as shown by a spot 715 on the key "a", a user clicks on or touches the simple final key "a". This action is the same as the action shown by spot 615 in FIG. 6. In response to clicking on or touching the simple final key "a", computer system 100 displays auxiliary keys "i", "o", "n", and "ng" corresponding to the simple final key "a" in an area 730 (indicated by a dashed box) of the keyboard layout of HMI 700, in accordance with step 220 of the method 200.

Additionally, as shown in FIG. 7A, candidate Chinese characters {1. 啊 2. 阿 3. 吖 . . . } corresponding to the Pinyin "a" are displayed in a candidate Chinese character area 740. As an additional action, the user clicks on or slides a finger from the simple initial key "a" to an auxiliary key "ng", as shown by arrow 725 in FIG. 7B. In response, as shown in FIG. 7B, computer system 100 displays candidate Chinese characters {1. 昂 2. 盎 3. 航 . . . } corresponding to the Pinyin "ang" in the candidate Chinese character area 740. Thus, at step 230 according to the fourth scheme, initially candidate Chinese characters are displayed in candidate Chinese character area 740 corresponding to the simple final (in this example, the Pinyin "a" is the simple final), as shown in FIG. 7A. Subsequently, in response to selection of one of the auxiliary keys, candidate Chinese characters are displayed corresponding to a Pinyin which is a combination of the simple final and a symbol represented by the selected auxiliary key (in this example, the Pinyin "ang" is a combination of the simple final "a" and the symbol "ng" represented by the selected auxiliary key), as shown in FIG. 7B.

As an additional action, the user selects "昂" from the candidate Chinese character area 740 as shown in FIG. 7B, indicating the completion of the Pinyin input. In response to the completion of the Pinyin input, the input process returns to the initial state.

According to the four schemes previously described, a complete Chinese character Pinyin input may be completed via at most three button clicks or a finger slide passing through three keys (e.g., in the previously described second scheme). In some situations, a complete Chinese character Pinyin input may be completed by the user via a touch of a single Pinyin key (e.g., in the previously described third scheme) or via two button clicks or a finger slide passing through two keys (e.g., in the previously described first and fourth schemes).

As previously described, the screen of the smart device 305 shown in FIG. 3 may be a conventional LED display screen or may be a touchscreen. In the latter case, various embodiments as illustrated in FIG. 3 to FIG. 7 are especially applicable.

According to an embodiment of the present invention, multiple initials may be labeled on one initial key as displayed at step 210, and the initial represented by the initial key is an initial selected among the multiple initials. According to an embodiment, the selected initial is an initial that is touched or pointed to by a screen selection pointer.

Figure 8A:
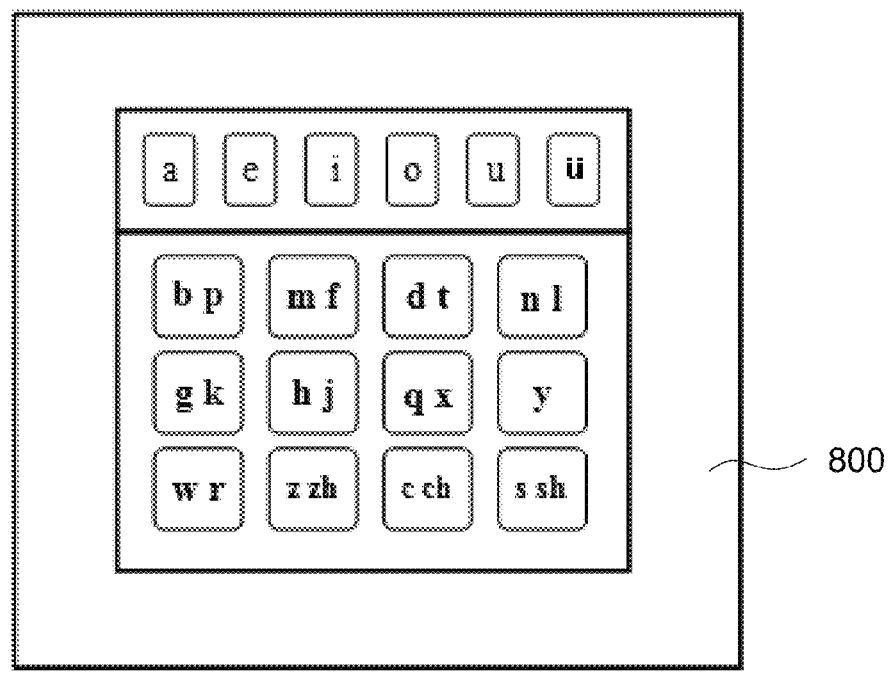
FIG. 8A to FIG. 10 schematically show optional keyboard layouts within respective HMIs, according to embodiments of the invention.
Figure 8B:
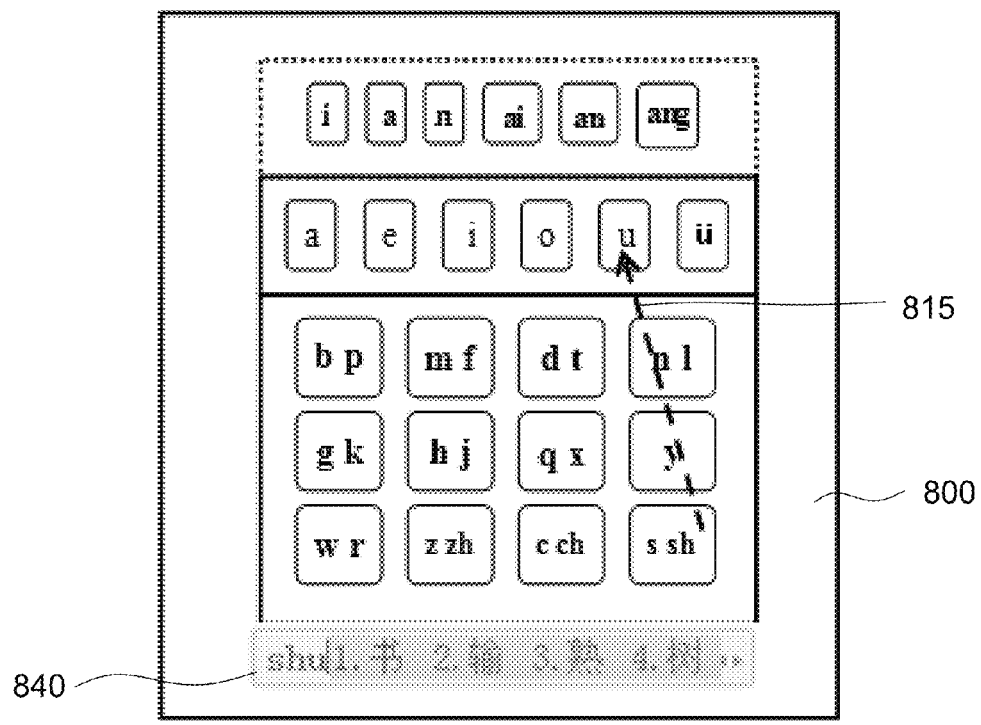

FIG. 8A shows HMI 800 having another configuration of initial keys. In the keyboard layout shown in FIG. 8A, multiple initials may share the same key. For example, initials "s" and "sh" may share the same key. The key represents initial "s" when initial "s" is touched or clicked by a user and represents initial "sh" when initial "sh" is touched or clicked by the user. As shown in FIG. 8B, if a finger of a user slides towards a simple final (in this instance, "u") from a position where initial "sh" is labeled on the key, as indicated by an arrow 815, the key represents initial "sh". Thus, candidate Chinese characters corresponding to the Pinyin "shu" are displayed in candidate Chinese character area 840. In an embodiment, multiple simple finals may share the same key as well, which is not described in detail herein.

According to an embodiment of the present invention, relative positions between auxiliary keys, simple final keys, and initial keys satisfy one of the following conditions: (i) the simple final keys are located above the initial keys, and the auxiliary keys associated with a simple final key are located above the simple final keys; (ii) the simple final keys are located to the left of the initial keys, and the auxiliary keys associated with a simple final key are located to the left of the simple final keys; (iii) the simple final keys are located to the right of the initial keys, and the auxiliary keys associated with a simple final key are located to the right of the simple final keys; or (iv) the simple final keys are located below the initial keys, and the auxiliary keys associated with a simple final key are located below the simple final keys.

Figure 9:
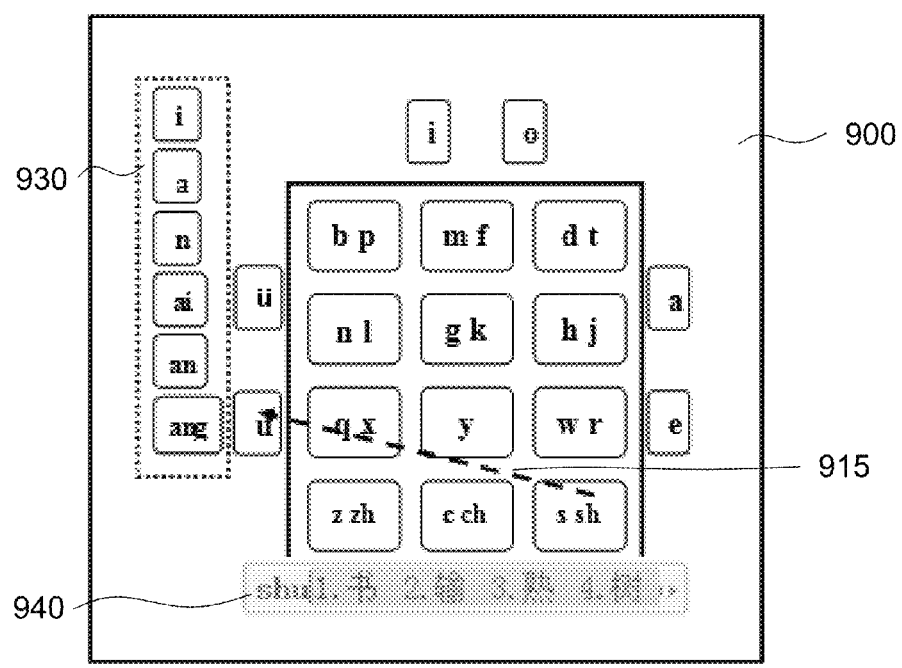

FIG. 9 shows HMI 900 having another form of the keyboard layout shown in FIG. 8B. In this layout, a simple final key "u" is located to the left of initial keys, and as shown by a dashed box 930, auxiliary keys "i", "a", "n", "ai", "an", and "ang" associated with the simple final key "u" are located to the left of the simple final key "u". As also shown in FIG. 9, simple finals may be arranged in different directions with respect to the initial keys. If a finger of a user slides towards a simple final (in this instance, "u") from a position where initial "sh" is labeled on the key, as indicated by an arrow 915, the key represents initial "sh". Thus, candidate Chinese characters corresponding to the Pinyin "shu" are displayed in a candidate Chinese character area 940.

Figure 10:
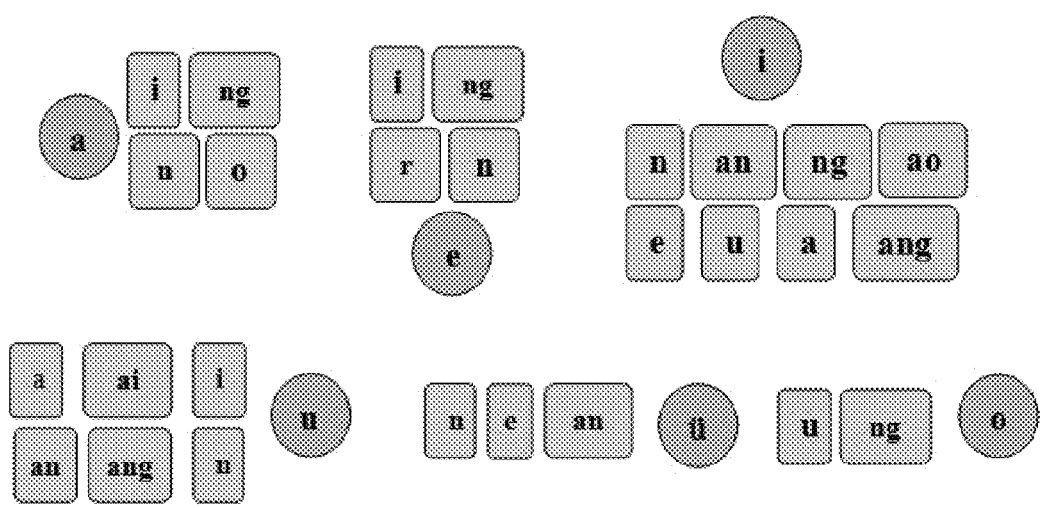

FIG. 10 shows other keyboard layouts. Initial keys are omitted from FIG. 10. FIG. 10 shows that, for example, the simple final key "a" may be arranged to the right of initial keys, and auxiliary keys "i", "n", "ng", and "o" associated therewith may be arranged into multiple lines (herein, two lines) to the right of this simple final key. Additionally, the simple final key "i" may be arranged below the initial keys, and auxiliary keys "n", "an", "ng", "ao", "e", "u", "a", and "ang" associated therewith may be arranged below this simple final key, and so forth. The keyboard layouts as described herein and as illustrated in FIG. 10 are all within the scope of the present invention.

Various embodiments of implementing the method of the present invention have been described above with reference to the drawings. Those skilled in the art may understand that the above method may be implemented in software, hardware, or a combination thereof. Also, those skilled in the art may understand that various steps of the above method may be implemented in software, hardware, or a combination thereof. A Chinese character Pinyin input apparatus based on the concept of the present invention may be provided. Due to the function of software contained in the apparatus, the apparatus exhibits features distinct from general processing devices, even though the apparatus is the same as general processing devices in its hardware structure, to form the apparatus of various embodiments of the present invention. The apparatus of the present invention comprises a number of units or modules, which may be configured to perform corresponding steps. Those skilled in the art may understand how to program to realize actions executed by those units or modules via the disclosure presented herein.

Figure 11:
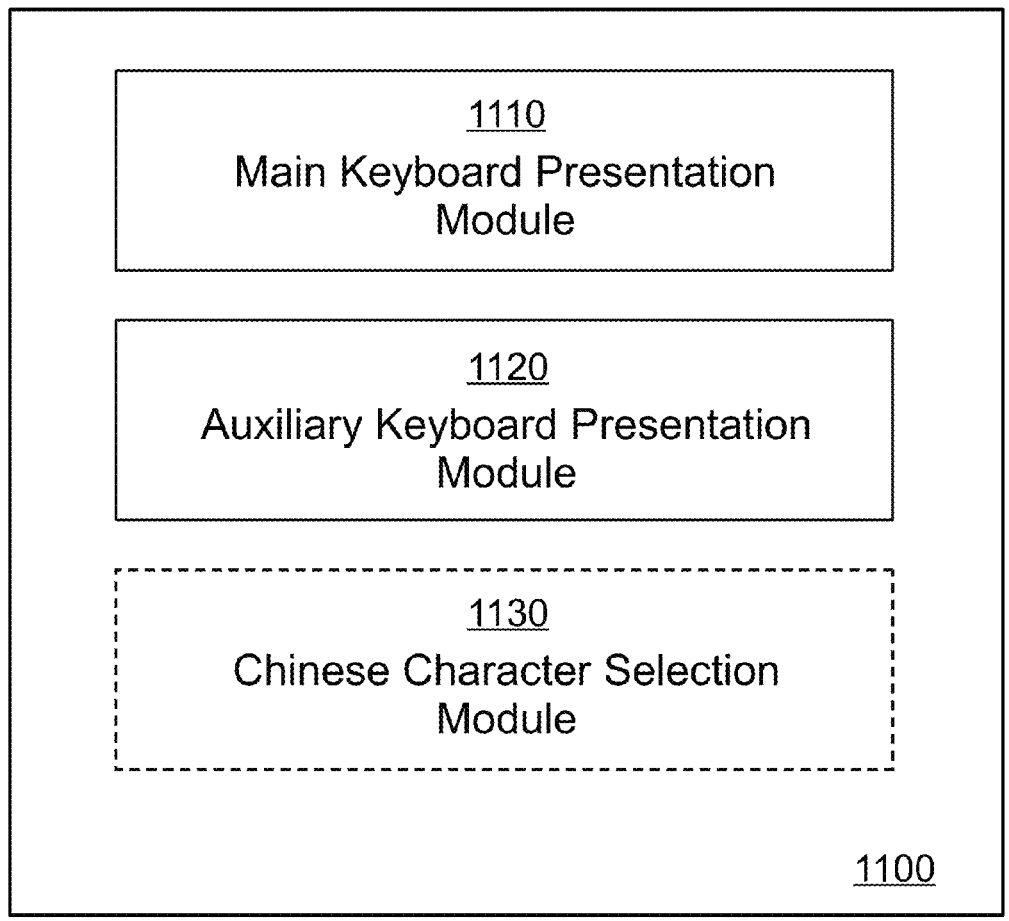
FIG. 11 schematically shows a block diagram of a Pinyin input apparatus, according to an embodiment of the invention.

Referring to FIG. 11, a simple block diagram of a Chinese character Pinyin input apparatus 1100 according to an embodiment of the present invention is schematically shown. As shown, apparatus 1100 includes a main keyboard presentation module 1110 and an auxiliary keyboard presentation module 1120. The main keyboard presentation module 1110 is configured to display initial keys representing all initials and simple final keys representing all simple finals on a HMI, e.g., on a screen. The auxiliary keyboard presentation module 1120 is configured to, in response to an operation with respect to a simple final, display on the HMI auxiliary keys corresponding to the simple final, wherein various combinations of the simple final and symbols represented by the auxiliary keys respectively form compound finals starting with the simple final. The screen may be a conventional LED display screen or may be a touchscreen. According to an embodiment, apparatus 1100 includes Chinese character selection module 1130.

According to an embodiment of the present invention, the operation with respect to a simple final includes one of (i) touching an initial key and then touching a simple final key representing the simple final or (ii) sliding from an initial key to a simple final key representing the simple final.

According to an embodiment of the present invention, the Chinese character selection module 1130 is configured to display in a candidate Chinese character area candidate Chinese characters corresponding to a Pinyin which is a combination of an initial represented by the initial key and the simple final.

According to a further embodiment of the present invention, the Chinese character selection module 1130 is further configured, in response to selection of one of the auxiliary keys by the user, to display in the candidate Chinese character area Chinese characters corresponding to a Pinyin which is a combination of an initial represented by the initial key, the simple final, and a symbol represented by the auxiliary key.

According to a further embodiment of the present invention, the operation with respect to a simple final includes directly clicking on or touching a simple final key representing the simple final. According to such embodiment, the Chinese character selection module 1130 is configured to display in a candidate Chinese character area candidate Chinese characters corresponding to the simple final. Those skilled in the art may understand that the selection module with the functionality as described in this embodiment may be separate from the selection module with the functionality as described in the previous embodiment or may be a further functional expansion of the selection module with the functionality as described in the previous embodiment.

According to an embodiment of the present invention, the Chinese character selection module 1130 is further configured, in response to selection of one of the auxiliary keys, to display in the candidate Chinese character area candidate Chinese characters corresponding to a Pinyin which is a combination of the simple final and a symbol represented by the auxiliary key.

According to an embodiment of the present invention, multiple initials are labeled on the initial key, and the initial represented by the initial key is an initial selected among the multiple initials. According to an embodiment, the selected initial is an initial that is touched or pointed to by a screen selection pointer.

According to an embodiment of the present invention, the main keyboard presentation module 1110 and the auxiliary keyboard presentation module 1120 are configured such that relative positions between the auxiliary keys, the simple final keys, and the initial keys on the screen satisfy one of the following conditions: (i) the simple final keys are located above the initial keys, and the auxiliary keys associated with a simple final key are located above the simple final keys; (ii) the simple final keys are located to the left of the initial keys, and the auxiliary keys associated with a simple final key are located to the left of the simple final keys; (iii) the simple final keys are located to the right of the initial keys, and the auxiliary keys associated with a simple final key are located to the right of the simple final keys; or (iv) the simple final keys are located below the initial keys, and the auxiliary keys associated with a simple final key are located below the simple final keys.

The Chinese character Pinyin input apparatus of the present invention has been described above. In the embodiments illustrating the apparatus, contents that are the same with respect to the apparatus as with respect to the Chinese character Pinyin input method, or contents that may be derived from the above description, have been omitted.

In accordance with the Chinese character Pinyin input method and apparatus of the present invention, in the initial state, all initial keys and all simple final keys are displayed on a screen. When a simple final is touched by a user, multiple auxiliary keys corresponding to such simple final are automatically displayed. Thus, the input of a complete Pinyin may be realized through starting from a key position on an initial key, passing through a simple final key, and sliding to a key position on a corresponding auxiliary key. Therefore, user operation is achieved without the need of remembering key positions. Initial keys, simple final keys, and dynamically generated auxiliary keys are simultaneously displayed on the screen, making it possible to display a slide path of a finger or a screen pointer in the virtual keyboard area without occupying excessive screen space.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A Pinyin input method comprising:
    displaying on a human-machine interaction interface (HMI), in an initial key area, initial keys representing all initials included in a Pinyin system;
    displaying on the HMI, in a simple final key area, simple final keys representing all simple finals included in the Pinyin system; and
    in response to an operation with respect to a simple final:
        dynamically displaying on the HMI, in an auxiliary key area linearly partitioned from the simple final key area, auxiliary keys corresponding to the simple final, wherein various combinations of the simple final and symbols represented by the auxiliary keys respectively form compound finals starting with the simple final, and wherein the compound finals include two-letter combinations, three-letter combinations, and four-letter combinations; and
        dynamically displaying on the HMI candidate Chinese characters corresponding to a Pinyin, wherein the candidate Chinese characters are displayed simultaneously with the initial keys, the simple final keys, and the auxiliary keys.

2. The method of claim 1, wherein the operation with respect to the simple final comprises one of (i) touching an initial key and then touching a simple final key representing the simple final or (ii) sliding from an initial key to a simple final key representing the simple final.

3. The method of claim 2, wherein the candidate Chinese characters are displayed in a candidate Chinese character area, and wherein the Pinyin is a combination of an initial represented by the initial key and the simple final.

4. The method of claim 3, further comprising:
    in response to selection of one of the auxiliary keys, dynamically displaying in the candidate Chinese character area candidate Chinese characters corresponding to a Pinyin which is a combination of an initial represented by the initial key, the simple final, and a symbol represented by the selected auxiliary key.

5. The method of claim 2, wherein multiple initials are labeled on the initial key, and wherein the initial represented by the initial key is an initial selected among the multiple initials.

6. The method of claim 1, wherein the operation with respect to the simple final comprises directly clicking on or touching a simple final key representing the simple final, and wherein the candidate Chinese characters are displayed in a candidate Chinese character area, and wherein the Pinyin corresponds to the simple final.

7. The method of claim 6, further comprising:
    in response to selection of one of the auxiliary keys, dynamically displaying in the candidate Chinese character area candidate Chinese characters corresponding to a Pinyin which is a combination of the simple final and a symbol represented by the selected auxiliary key.

8. The method of claim 1, wherein the simple final keys are located above the initial keys, and wherein the auxiliary keys associated with a simple final key are located above the simple final keys.

9. The method of claim 1, wherein the auxiliary key area is horizontally partitioned from the simple final key area.

10. The method of claim 1, wherein the simple final keys are located to the left of the initial keys, and wherein the auxiliary keys associated with a simple final key are located to the left of the simple final keys.

11. The method of claim 1, wherein the simple final keys are located to the right of the initial keys, and wherein the auxiliary keys associated with a simple final key are located to the right of the simple final keys.

12. The method of claim 1, wherein the simple final keys are located below the initial keys, and the auxiliary keys associated with a simple final key are located below the simple final keys.

13. A Pinyin input human-machine interaction interface (HMI) apparatus comprising:
    an initial key area including initial keys representing all initials included in a Pinyin system;
    a simple final key area including simple final keys representing all simple finals included in the Pinyin system;
    an auxiliary key area, linearly partitioned from the simple final key area, including auxiliary keys corresponding to a simple final that are dynamically displayed in response to an operation with respect to the simple final, wherein various combinations of the simple final and symbols represented by the auxiliary keys respectively form compound finals starting with the simple final and wherein the compound finals include two-letter combinations, three-letter combinations, and four-letter combinations; and
    a candidate Chinese character area including candidate Chinese characters corresponding to a Pinyin, wherein the candidate Chinese characters are dynamically displayed simultaneously with the initial keys, the simple final keys, and the auxiliary keys in response to the operation with respect to the simple final.

14. The apparatus of claim 13, wherein the operation with respect to the simple final comprises one of (i) touching an initial key and then touching a simple final key representing the simple final or (ii) sliding from an initial key to a simple final key representing the simple final.

15. A computer program product comprising a computer readable storage medium having computer readable program code embodied thereon, wherein the computer readable storage medium is not a transitory signal per se, and wherein the computer readable program code is adapted to:
  display on a human-machine interaction interface (HMI), in an initial key area, initial keys representing all initials included in a Pinyin system;
  display on the HMI, in a simple final key area, simple final keys representing all simple finals included in the Pinyin system; and
  in response to an operation with respect to a simple final:
    dynamically display on the HMI, in an auxiliary key area linearly partitioned from the simple final key area, auxiliary keys corresponding to the simple final, wherein various combinations of the simple final and symbols represented by the auxiliary keys respectively form compound finals starting with the simple final and wherein the compound finals include two-letter combinations, three-letter combinations, and four-letter combinations; and
    dynamically display on the HMI candidate Chinese characters corresponding to a Pinyin, wherein the candidate Chinese characters are displayed simultaneously with the initial keys, the simple final keys, and the auxiliary keys.

16. The computer program product of claim 15, wherein the operation with respect to a simple final comprises one of (i) touching an initial key and then touching a simple final key representing the simple final or (ii) sliding from an initial key to a simple final key representing the simple final.

17. The computer program product of claim 16, wherein the candidate Chinese characters are displayed in a candidate Chinese character area, and wherein the Pinyin is a combination of an initial represented by the initial key and the simple final.

18. The computer program product of claim 17, wherein the computer readable program code further is adapted to:
  in response to selection of one of the auxiliary keys, dynamically display in the candidate Chinese character area candidate Chinese characters corresponding to a Pinyin which is a combination of an initial represented by the initial key, the simple final, and a symbol represented by the selected auxiliary key.

19. The computer program product of claim 15, wherein the operation with respect to the simple final comprises directly clicking on or touching a simple final key representing the simple final, and wherein the candidate Chinese characters are displayed in a candidate Chinese character area, and wherein the Pinyin corresponds to the simple final.

20. The computer program product of claim 19, wherein the computer readable program code further is adapted to:
  in response to selection of one of the auxiliary keys, dynamically display in the candidate Chinese character area candidate Chinese characters corresponding to a Pinyin which is a combination of the simple final and a symbol represented by the selected auxiliary key.

* * * * *